US012125600B2

(12) United States Patent
Modzel

(10) Patent No.: US 12,125,600 B2
(45) Date of Patent: Oct. 22, 2024

(54) MECHANICAL GRASPING END EFFECTOR WITH LINEAR ENGAGEMENT AND DISENGAGEMENT MOVEMENT

(71) Applicant: Ford Global Technologies, LLC, Dearborn, MI (US)

(72) Inventor: John Modzel, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 497 days.

(21) Appl. No.: 17/497,408

(22) Filed: Oct. 8, 2021

(65) Prior Publication Data

US 2023/0112549 A1    Apr. 13, 2023

(51) Int. Cl.
*G21C 19/105* (2006.01)
*B21C 3/14* (2006.01)
*B66C 1/54* (2006.01)
*G21C 3/14* (2006.01)

(52) U.S. Cl.
CPC .............. *G21C 19/105* (2013.01); *B66C 1/54* (2013.01); *G21C 3/14* (2013.01)

(58) Field of Classification Search
CPC ............ G21C 19/105; G21C 3/14; B66C 1/54
USPC ...................................................... 294/96, 95
See application file for complete search history.

(56) References Cited

U.S. PATENT DOCUMENTS

| 3,199,911 | A | * | 8/1965 | Denoit | B66C 1/54 |
| | | | | | 294/95 |
| 3,408,101 | A | * | 10/1968 | Savary | G21C 19/10 |
| | | | | | 294/95 |
| 3,485,388 | A | * | 12/1969 | Bohne | B66C 1/54 |
| | | | | | 294/96 |
| 3,698,756 | A | | 10/1972 | Groves | |
| 3,731,364 | A | * | 5/1973 | Romero | B25B 27/18 |
| | | | | | 29/261 |
| 4,244,616 | A | * | 1/1981 | Buchalet | G21C 1/303 |
| | | | | | 294/95 |
| 4,362,692 | A | * | 12/1982 | Greenaway | G21C 19/105 |
| | | | | | 294/906 |
| RE31,131 | E | * | 1/1983 | Torbet | E04G 21/142 |
| | | | | | 294/95 |

(Continued)

FOREIGN PATENT DOCUMENTS

DE    2726870    1/1979
EP    0495362    7/1992

*Primary Examiner* — Paul T Chin
(74) *Attorney, Agent, or Firm* — Burris Law, PLLC

(57) ABSTRACT

A mechanical device for grasping an object includes a receiver having a distal end shaft with an internal bore, the internal bore defining a recessed track. The recessed track defines a curvilinear path having two sets of resting peaks, each set of resting peaks being at a different height relative to a centerline of the curvilinear path. An actuator is slidably engaged with the receiver and includes a central shaft and an activator disposed at a distal end portion of the central shaft. A rotatable sleeve is disposed within the internal bore of the receiver and is coupled to the actuator. The rotatable sleeve has opposed protrusions, the opposed protrusions being disposed within the recessed track of the receiver. A pilot is secured to a distal end portion of the receiver and a grasping device is mounted to the pilot and coupled to the activator.

20 Claims, 9 Drawing Sheets

(56) References Cited

U.S. PATENT DOCUMENTS

| | | | | |
|---|---|---|---|---|
| 4,997,225 A | * | 3/1991 | Denis | E21B 31/20 |
| | | | | 294/95 |
| 9,390,821 B2 | * | 7/2016 | Allison | B66C 1/54 |
| 11,358,838 B2 | * | 6/2022 | Jamieson | B66C 3/005 |

* cited by examiner

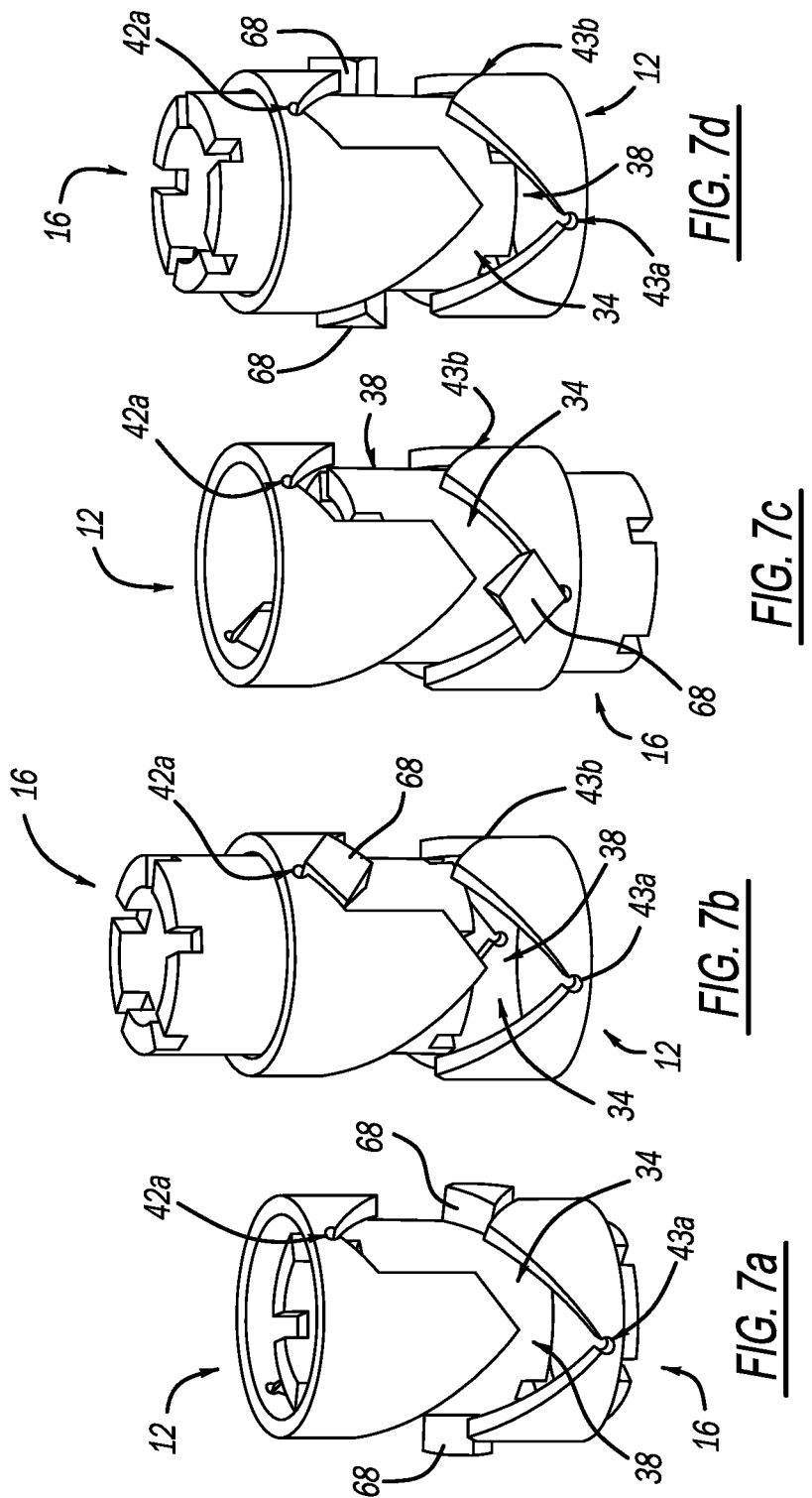

MECHANICAL GRASPING END EFFECTOR WITH LINEAR ENGAGEMENT AND DISENGAGEMENT MOVEMENT

FIELD

The present disclosure relates to robotic systems and exoskeleton suits with end effectors, and more particularly to end effectors that are configured to grasp and move objects.

BACKGROUND

The statements in this section merely provide background information related to the present disclosure and may not constitute prior art.

Industrial robots have been used for a variety of manufacturing operations, including by way of example, welding, placement of parts for subsequent fabrication or assembly operations, and moving parts from one location to another such as retrieving parts from a storage location and moving them to an assembly station. These industrial robots include end effectors, which are the hands of the robot. In many applications, the end effectors are configured as grippers, which grasp a part and move the part to a different location or manipulate the position of the part for manufacturing operations.

Recently, exoskeleton suits have been developed, which are wearable mobile robotic accessories powered by electric motors, pneumatics or hydraulics, or other systems to allow a user to have increased strength and endurance when performing various operations, such as industrial manufacturing operations. These exoskeleton suits also have end effectors, which come in a variety of configurations depending on the particular manufacturing operation. However, exoskeleton suits are often heavy and cumbersome, as power is required for their operation. In some environments, power may not be available, or power from a battery may be dissipated before completion of the manufacturing task using the exoskeleton suit.

These issues related to exoskeleton suits, among other issues related to robotic end effectors, are addressed by the present disclosure.

SUMMARY

This section provides a general summary of the disclosure and is not a comprehensive disclosure of its full scope or all of its features.

In one form, the present disclosure provides a mechanical device for grasping an object. The mechanical device comprises a receiver, an actuator, a rotatable sleeve, a pilot, and a grasping device. The receiver comprises a distal end shaft having an internal bore. The internal bore defines a recessed track. The actuator is slidably engaged with the receiver. The actuator comprises a central shaft and an activator disposed at a distal end portion of the central shaft. The rotatable sleeve is disposed within the internal bore of the receiver and is coupled to the actuator. The rotatable sleeve comprises at least one protrusion. The protrusion is disposed within the recessed track of the receiver. The pilot is secured to a distal end portion of the receiver. The grasping device is mounted to the pilot and coupled to the activator.

In variations of the robotic gripper apparatus of the above paragraph, which may be implemented individually or in any combination: the activator is a bulb having a diameter larger than a diameter of the central shaft; the grasping device comprises a plurality of fingers rotatably mounted to the pilot, the plurality of fingers defining an upper portion having an internal profiled geometry conforming to an external surface of the bulb; the rotatable sleeve comprises opposed protrusions; opposed protrusions are diamond shaped; pilot is interchangeable; the pilot is threadably engaged within the internal bore of the receiver; the grasping device comprises a plurality of fingers rotatably mounted to the pilot; the recessed track defines a curvilinear path having two sets of resting peaks, each set of resting peaks being at a different height relative to a centerline of the curvilinear path; the actuator further comprises an upper flange and a lower flange, and the rotatable sleeve is mounted between the upper flange and the lower flange; the pilot defines an inwardly tapered distal end portion; the receiver further comprises a base portion adapted to be secured to an external component; the receiver further comprises a plurality of support legs extending between the base portion and the distal end shaft, and the actuator comprises an outer ring defining a plurality of slots, wherein the plurality of support legs are disposed within the plurality of slots; the mechanical device does not comprise any biasing members.

In another form, the present disclosure provides a mechanical device for grasping an object. The mechanical device comprises a receiver, an actuator, a rotatable sleeve, a pilot, and a grasping device. The receiver comprises a distal end shaft having an internal bore. The internal bore defines a recessed track. The recessed track defines a curvilinear path having two sets of resting peaks. Each set of resting peaks being at a different height relative to a centerline of the curvilinear path. The actuator is slidably engaged with the receiver. The actuator comprises a central shaft and an activator disposed at a distal end portion of the central shaft. The rotatable sleeve is disposed within the internal bore of the receiver and is coupled to the actuator. The rotatable sleeve comprises opposed protrusions. The opposed protrusions are disposed within the recessed track of the receiver. The pilot is secured to a distal end portion of the receiver. The grasping device is mounted to the pilot and is coupled to the activator.

In yet another form, the present disclosure provides a mechanical device for grasping an object. The mechanical device comprises a receiver, an actuator, a rotatable sleeve, a pilot, and a plurality of fingers. The receiver comprises a distal end shaft having an internal bore. The internal bore defines a recessed track. The recessed track defines a curvilinear path having two sets of resting peaks. Each set of resting peaks being at a different height relative to a centerline of the curvilinear path. The actuator is slidably engaged with the receiver. The actuator comprises a central shaft and a bulb disposed at a distal end portion of the central shaft. The rotatable sleeve is disposed within the internal bore of the receiver. The rotatable sleeve comprises opposed protrusions. The opposed protrusions define a diamond shape and are disposed within the recessed track of the receiver. The interchangeable pilot is secured to a distal end portion of the receiver. The plurality of fingers are rotatably mounted to the interchangeable pilot. The plurality of fingers define an upper portion having an internal profiled geometry conforming to an external surface of the bulb.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 7a-7d are perspective views of the mechanical device of FIG. 1 at different operating positions with an actuator, a pilot, and portions of a receiver of the mechanical device removed for clarity;

Figure 1:
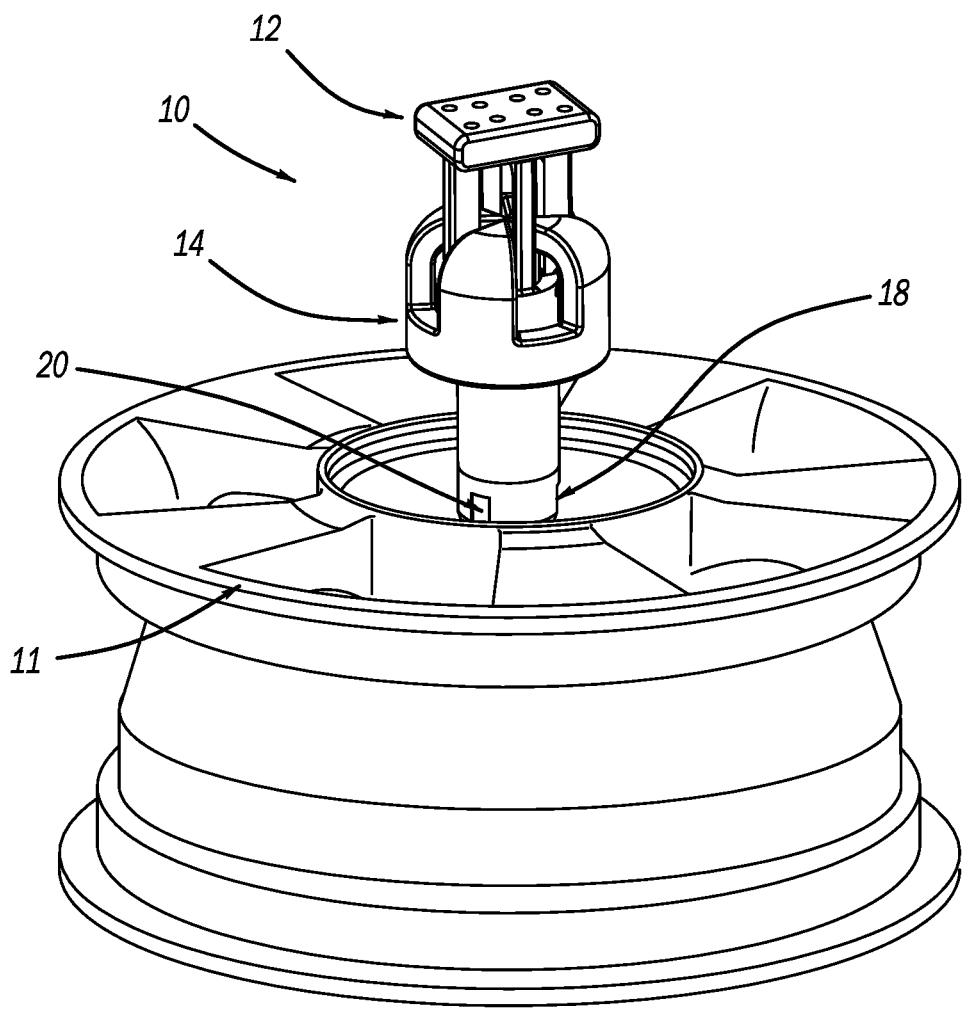
FIG. 1 is a perspective view of a mechanical device grasping an object according to the principles of the present disclosure.
Figure 2:
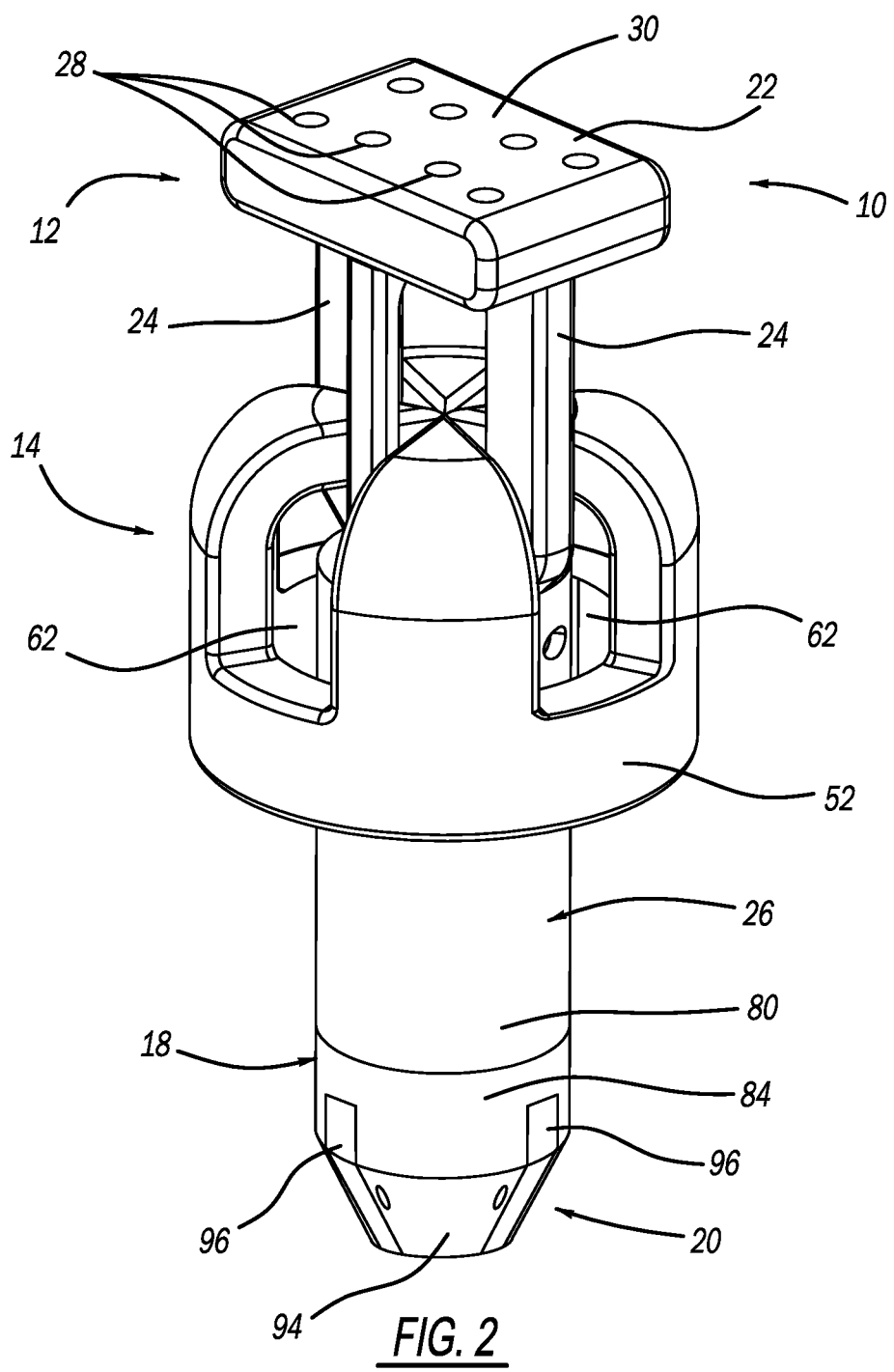
FIG. 2 is another perspective view of the mechanical device of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a mechanical device 10 is provided for grasping an object 11 such as a wheel. The mechanical device 10 is constructed so as to be operable without a power source (not shown), however, a power source may be implemented with the mechanical device 10 while remaining within the present disclosure. In one form, the mechanical device 10 includes an optional adapter (not shown) that is adapted to be secured to an exo-suit (not shown). However, it should be understood that the adapter can be connected to any device such as a robotic arm or other structure/device, and the teachings herein should not be limited to an exo-suit application.

With additional reference to FIGS. 2-9, the mechanical device 10 includes a receiver 12 (FIGS. 1-5, 6a-6d, and 7a-7d), an actuator 14 (FIGS. 1-4 and 6a-6d), a rotatable sleeve 16 (FIGS. 3, 4, 7a-7d, and 8), a pilot 18 (FIGS. 1-4, 6a-6d, and 9), and a grasping device 20 (FIGS. 1-5, 6a-6d, and 9). The receiver 12 includes a base portion 22, a plurality of support legs 24 and a distal end shaft 26. The base portion 22 is adapted to be secured to an external component (not shown) such as an exo-suit. In one form, the base portion 22 can be secured to an optional adapter (not shown) that is in turn secured to the external component. The base portion 22 may be rectangular-shape and includes a plurality of apertures 28 (FIGS. 2 and 3) and an outer surface 30. The apertures 28 may extend through the base portion 22. Fasteners (not shown) such as bolts or screws, for example, may extend through the apertures 28, thereby securing the receiver 12 to the external component. The outer surface 30 is planar. In an alternative form, the outer surface 30 may be arcuate or any other suitable shape that facilitates attachment to the external component.

The plurality of support legs 24 are spaced apart from each other and extend between the base portion 22 and the distal end shaft 26. The plurality of support legs 24 include a first set of opposed legs 24 and a second set of opposed legs 24.

The distal end shaft 26 has a cylindrical-shape and includes an internal bore 32 (FIG. 4) that defines a recessed track 34 (FIGS. 4, 7a-7d and 8). The recessed track 34 defines a curvilinear path 38 (FIGS. 7a-7d and 8) having two sets of upper resting peaks 42a, 42b and two sets of lower resting peaks 43a, 43b. The set of upper resting peaks 42a is at a different height or distance relative to a centerline 46 (FIG. 8) of the curvilinear path 38 (i.e., the centerline 46 of the curvilinear path 38 is at a center location between the set of uppermost resting peaks 42a and the set of lowermost resting peaks 43a) than the set of upper resting peaks 42b. Similarly, the set of lower resting peaks 43a is at a different height or distance relative to the centerline 46 of the curvilinear path 38 than the set of lower resting peaks 43b. Each set of resting peaks 42a, 42b, 43a, 43b are formed by a pair of inclined engagement surfaces 48. The distal end shaft 26 includes apertures (FIG. 3) that facilitates the removal of powder from the receiver 12 when the receiver 12 is manufactured using an automated additive manufacturing machine (i.e., a 3-D printer).

With reference to FIGS. 1-5, 6a-6d, and 9, the actuator 14 is slidably engaged with the receiver 12 and includes an outer ring 52, a central shaft 54 (FIGS. 3 and 4), an upper flange 56 (FIG. 4), a lower flange 58 (FIGS. 3 and 4), and an activator 60 (FIGS. 3-5 and 9). The outer ring 52 surrounds the upper flange 56 and at least a portion of the central shaft 54. The outer ring 52 also includes a plurality of slots 62. The plurality of support legs 24 are disposed within the slots 62. The central shaft 54 extends in a longitudinal direction of the mechanical device 10 and extends through the internal bore 32 of the receiver 12. A portion of the central shaft 54 is also disposed within the pilot 18.

The upper flange 56 extends radially outwardly from a proximate end portion 65 of the central shaft 54 and is also proximate the outer ring 52. The lower flange 58 is spaced apart from the upper flange 56 along a longitudinal direction of the mechanical device 10, and also extends radially outwardly from the central shaft 54 at or near a center portion of the central shaft 54. The lower flange 58 includes a plurality of grooves formed therein. The grooves facilitate the removal of powder from the actuator 14 when the actuator 14 is manufactured using an automated additive manufacturing machine (i.e., a 3-D printer). The lower flange 58 is also disposed between the upper flange 56 and the activator 60, and within the internal bore 32 of the receiver 12. The activator 60 is disposed at a distal end portion 66 of the central shaft 54 and is disposed within the pilot 18. The activator 60 is a bulb having a diameter larger than a diameter of the central shaft 54.

Figure 4:
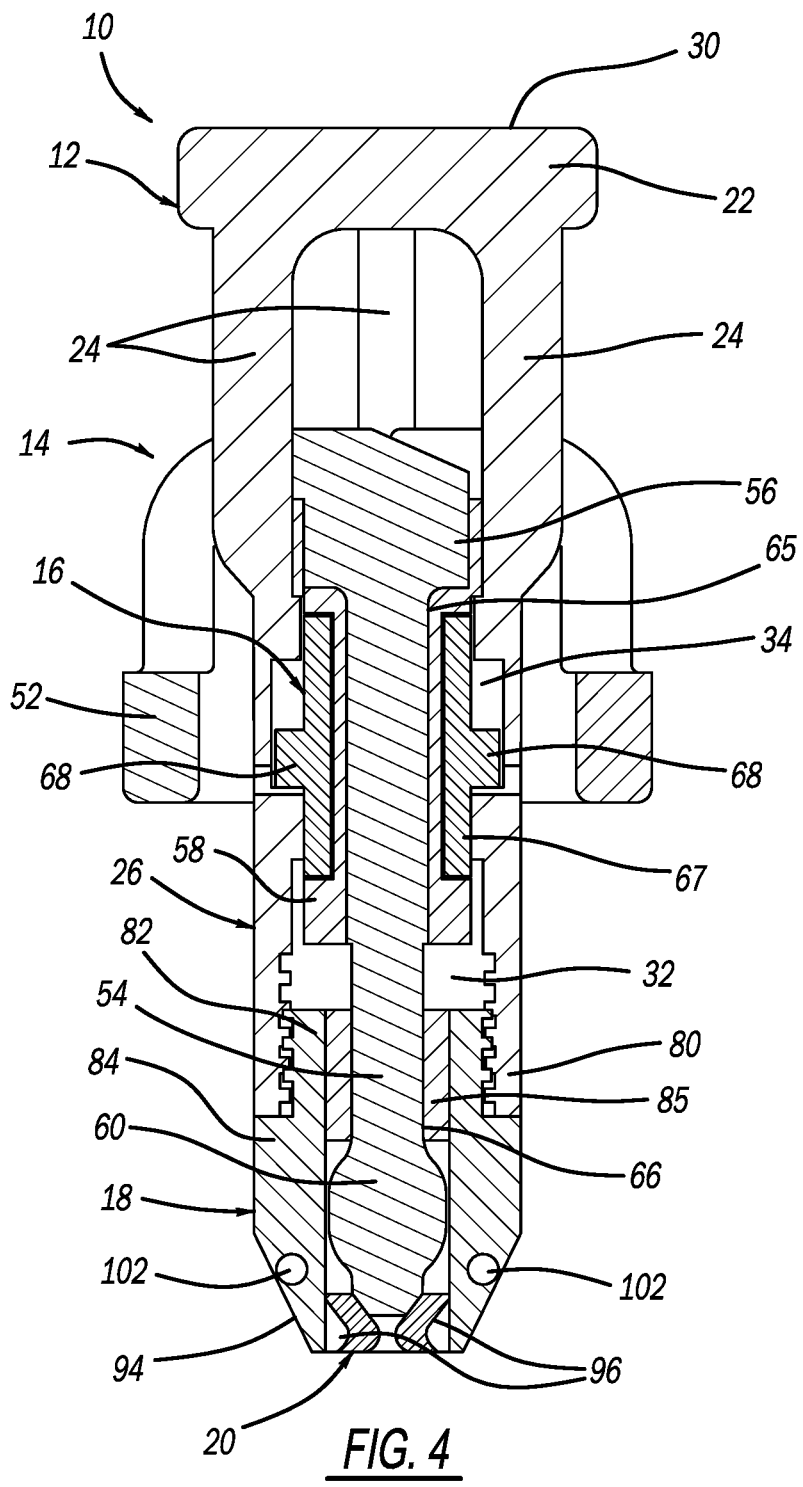
FIG. 4 is a cross-sectional view of the mechanical device of FIG. 1.

As shown in FIG. 4, the rotatable sleeve 16 is disposed within the internal bore 32 of the receiver 12. The rotatable sleeve 16 is coupled to the actuator 14 and is mounted between the upper flange 56 and the lower flange 58 of the actuator 14. The rotatable sleeve 16 is also disposed radially between the distal end shaft 26 of the receiver 12 and the central shaft 54 of the actuator 14.

Figure 3:
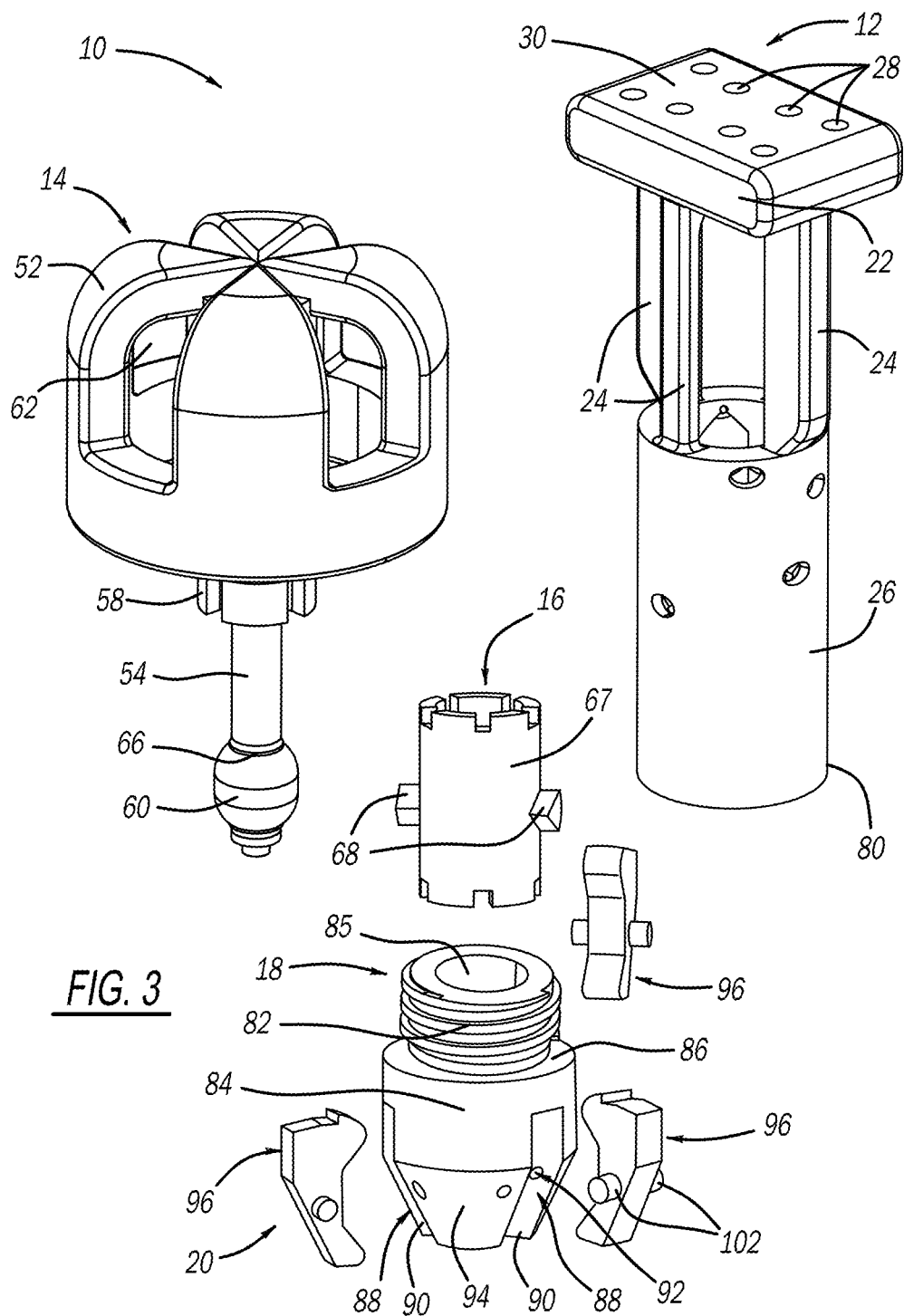
FIG. 3 is an exploded view of the mechanical device of FIG. 1.

With reference to FIGS. 3 and 4, the rotatable sleeve 16 includes a body 67 and a pair of diametrically opposed protrusions 68. The body 67 includes a central opening and a plurality of notches. The central opening extends through the body and receives the central shaft 54 of the actuator 14 (i.e., the central shaft 54 of the actuator 14 extends through the central opening). The plurality of notches are formed in and around opposed axial ends of the rotatable sleeve 16 and facilitate the removal of powder from the sleeve 16 when the sleeve 16 is manufactured using an automated additive manufacturing machine (i.e., 3-D printer).

Figure 8:
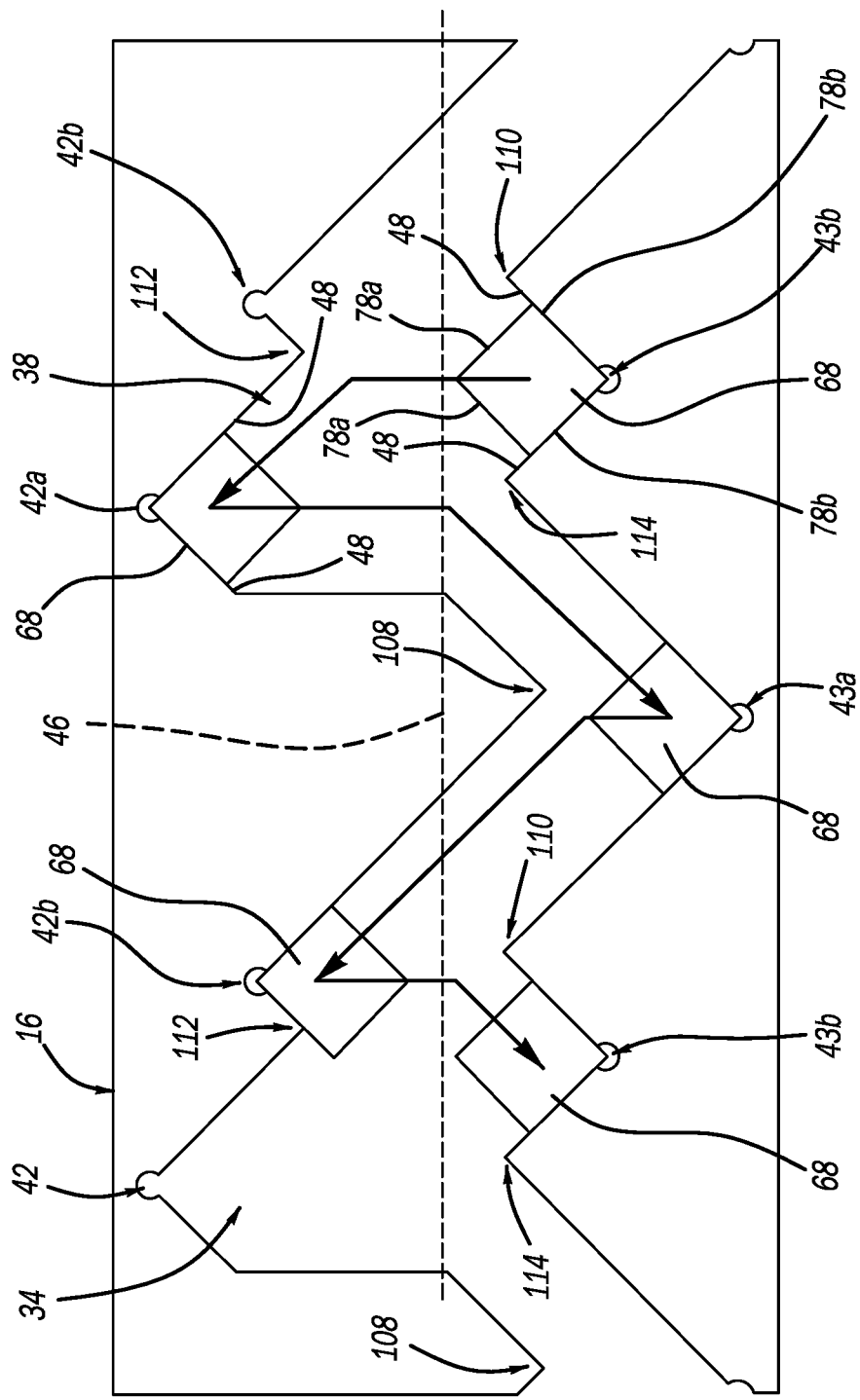
FIG. 8 is a plan view of a recessed track of a receiver of the mechanical device of FIG. 1 with a protrusion of a rotatable sleeve of the mechanical device positioned at different peaks of the recessed track.

The pair of diametrically opposed protrusions 68 are disposed within the recessed track 34 of the receiver 12. Each protrusion 68 is diamond shape, for example, and is configured to contact or abut against a respective resting peak 42a, 42b, 43a, 43b of the curvilinear path 38. As best shown in FIG. 8, each protrusion 68 includes a pair of upper engagement surfaces 78a and a pair of lower engagement surfaces 78b. The engagement surfaces 78a, 78b of the protrusions 68 are configured to engage respective engagement surfaces 48 of the resting peaks 42a, 42b, 43a, 43b as the protrusions 68 traverse the curvilinear path 38. For example, when the protrusions 68 contact the upper resting peak 42a, the upper engagement surfaces 78a of the protrusions 68 engage the engagement surfaces 48 forming the upper resting peak 42a. In another example, when the protrusions 68 contact the lower resting peak 43a, the lower engagement surfaces 78b of the protrusions 68 engage the engagement surfaces 48 forming the lower resting peak 43a. It should be understood that the engagement surfaces 48 forming each resting peak 42a, 42b, 43a, 43b define a space that accommodates the protrusions 68 when the protrusions 68 contact the resting peaks 42a, 42b, 43a, 43b.

With reference to FIGS. 1-4, 6a-6d, and 9, the pilot 18 is secured to a distal end portion 80 of the distal end shaft 26 of the receiver 12 and includes an attachment portion 82 and a finger mounting portion 84. An internal bore 85 (FIGS. 3 and 4) extends through the pilot 18 (i.e., extends through the attachment portion 82 and the finger mounting portion 84) and receives the activator 60 and a portion of the central shaft 54. The attachment portion 82 is cylindrical shape and is disposed within the internal bore 32 of the receiver 12. The attachment portion 82 includes external threads that are engaged to internal threads of the internal bore 32. In this way, the pilot 18 is interchangeable. The finger mounting portion 84 is externally located relative to the internal bore 32 and has a diameter that is larger than a diameter of the attachment portion 82. The finger mounting portion 84 also includes an annular land 86 (FIG. 3) and a plurality of longitudinally extending slots 88 (i.e., the slots 88 extend in the longitudinal direction of the mechanical device 10). The distal end shaft 26 abuts against the annular land 86. The plurality of slots 88 are formed in and around the finger mounting portion 84. Each slot 88 defines opposed surfaces 90 that include an aperture 92 formed therein (FIG. 3). The finger mounting portion 84 also includes an inwardly tapered distal end 94.

Figure 5:
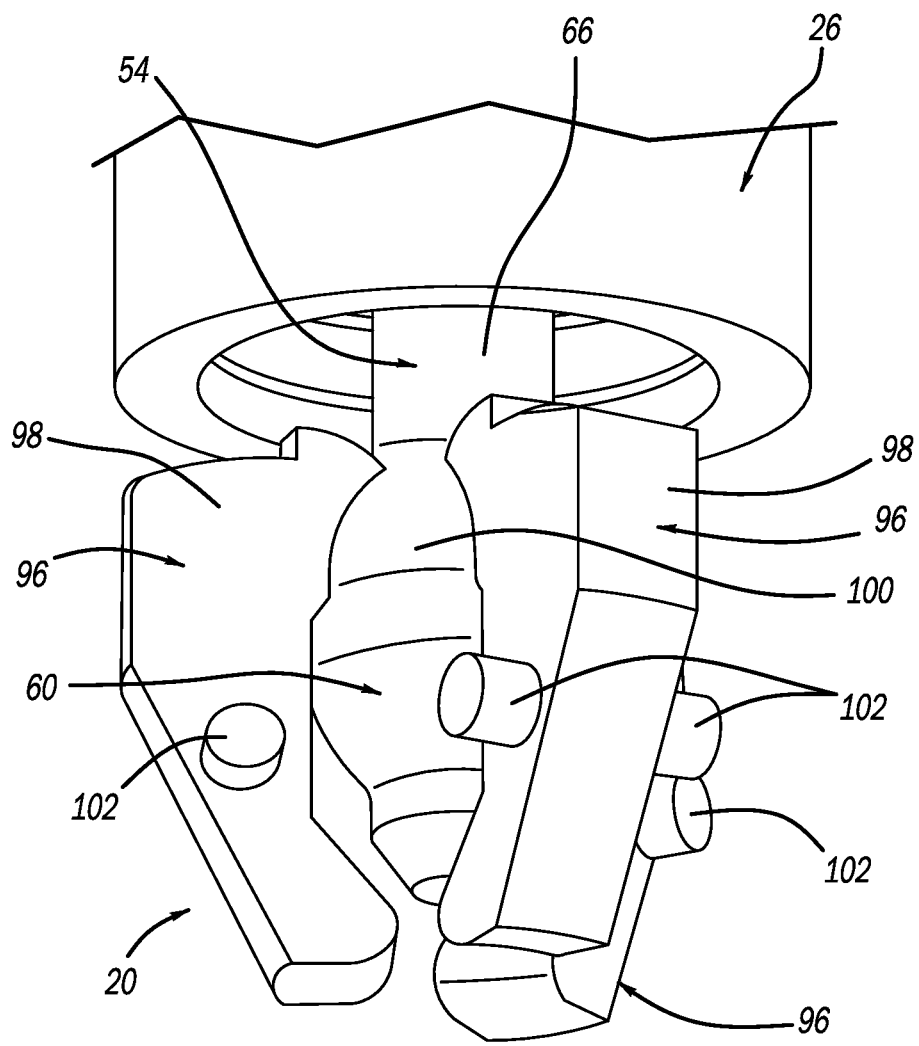
FIG. 5 is a perspective view of a grasping device of the mechanical device of FIG. 1.

The grasping device 20 is mounted to the pilot 18 and is coupled to the activator 60. The grasping device 20 includes a plurality of fingers 96 rotatably mounted to the pilot 18. Each finger 96 defines an upper portion 98 having an internal profiled geometry conforming to an external surface 100 of the activator 60 (i.e., the bulb). Each finger 96 also includes a pair of opposed lateral protrusions 102 (FIGS. 3 and 5). Each protrusion 102 extends from a respective side of the finger 96 and is received in a respective aperture 92 of the pilot 18, thereby rotatably mounting the finger 96 to the pilot 18.

Figure 9:
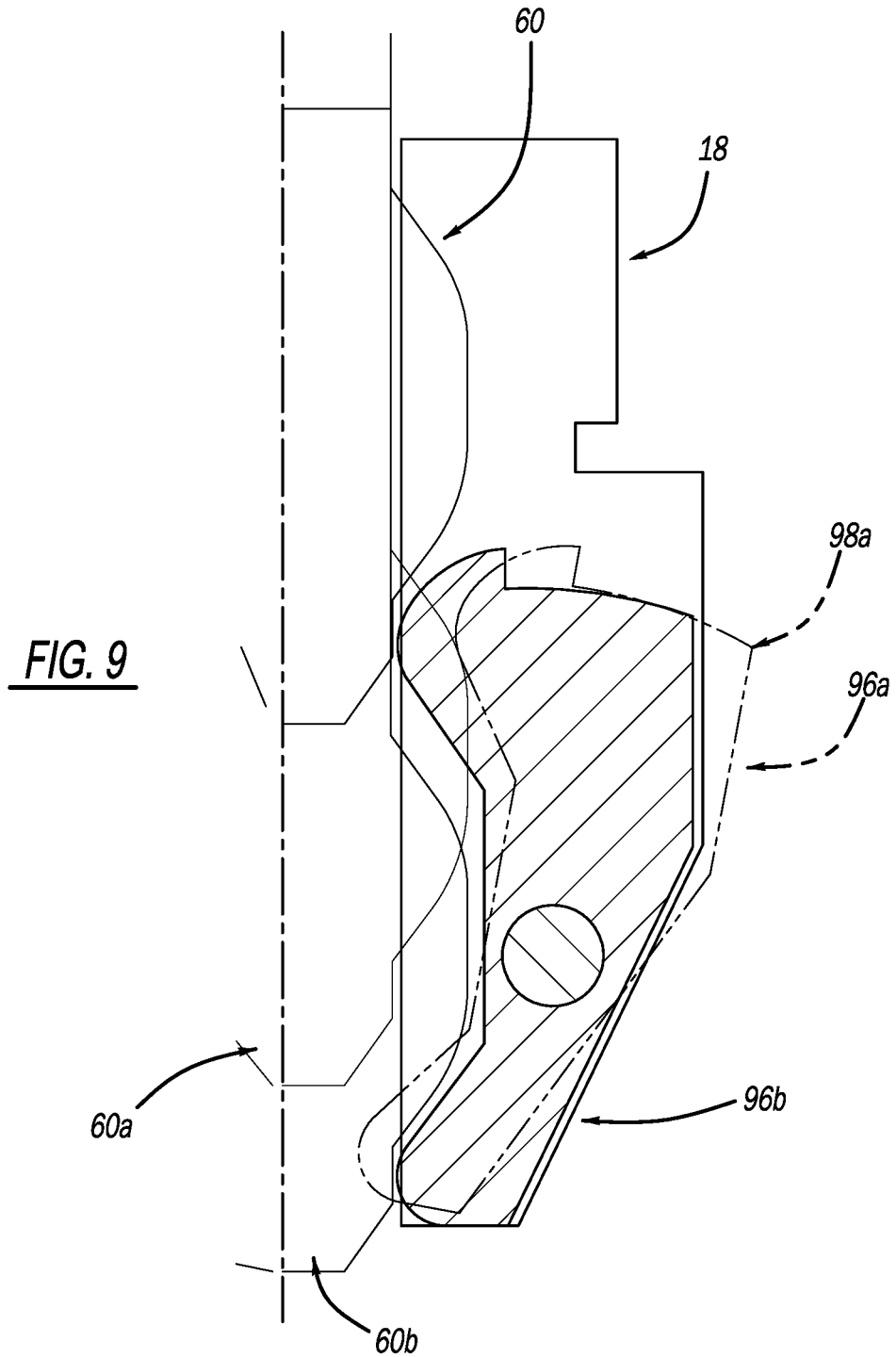
FIG. 9 a cross-sectional view of a portion of the mechanical device of FIG. 1.

With reference to FIGS. 7a, 8, and 9, when the protrusions 68 contact the lower resting peaks 43b, the activator 60 of the actuator 14 engages the upper portion 98 of the fingers 96 (i.e., the activator 60a engaging the upper portion 98a of finger 96a in FIG. 9), which causes the fingers 96 to rotate in a clockwise direction to a finger locked out position (i.e., the upper portion 98 of the fingers 96 protrudes out of the slots 88 of the pilot 18 and the fingers 96 are inhibited from rotating in the counter-clockwise direction). With reference to FIGS. 7c, 8, and 9, when the protrusions 68 contact the lower resting peaks 43a, the activator 60 of the actuator 14 engages a lower portion of the fingers 96 (i.e., the activator 60b engaging the lower portion of finger 96b in FIG. 9), which causes the fingers 96 to rotate in a counter-clockwise direction to a finger locked in position (i.e., the upper portion 98 of the fingers 96 is received within the slots 88 of the pilot 18 and the fingers 96 are inhibited from rotating in the clockwise direction). When the protrusions 68 contact the upper resting peaks 42a, 42b, the activator 60 of the actuator 14 may be disengaged from the fingers 96, thereby not forcing the fingers 96 in the finger locked out or finger locked in positions (i.e., the fingers 96 are free floating and are not rotated by the activator 60).

With continued reference to FIGS. 1-9, operation of the mechanical device 10 will be described in detail. First, the fingers 96 are moved to the finger locked in position and the mechanical device 10 is inserted into an opening in the object 11 (FIG. 1). Next, with reference to FIGS. 6d, 7d, and 8, the actuator 14 is forced upwardly by an operator (not shown), which causes the sleeve 16 to rotate in a predetermined rotational direction due to the protrusions 68 traversing the curvilinear path 38. That is, the lower resting peaks 43a are offset from respective resting peaks 108 of the curvilinear path 38 (FIG. 8), which causes the protrusions 68 to be directed through the curvilinear path 38 in a predetermined direction when the actuator 14 is forced upwardly to contact the upper resting peaks 42b. When the protrusions 68 contact the upper resting peaks 42b, the activator 60 is disengaged from the fingers 96 (i.e., the activator 60 does not force the fingers 96 in the finger locked out or finger locked in positions).

Figure 6D:
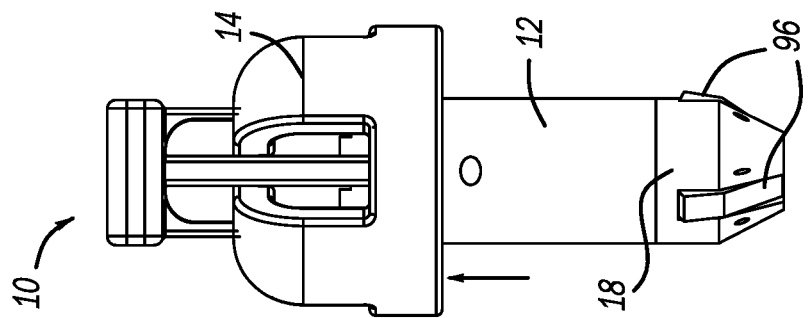
FIGS. 6a-6d are perspective views of the mechanical device of FIG. 1 at different operating positions.
Figure 6C:
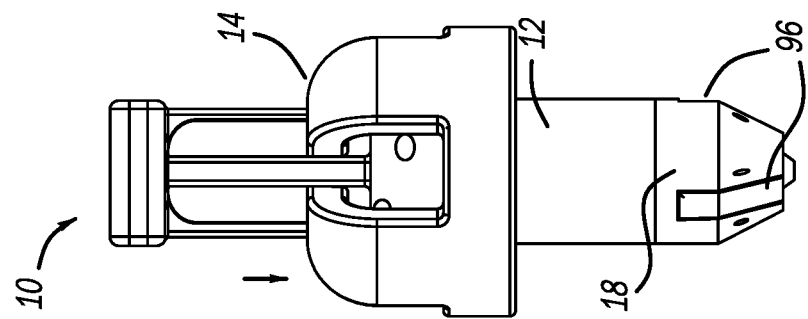
Figure 6B:
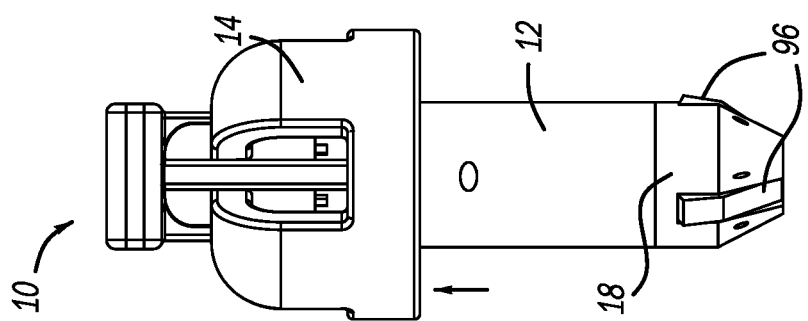
Figure 6A:
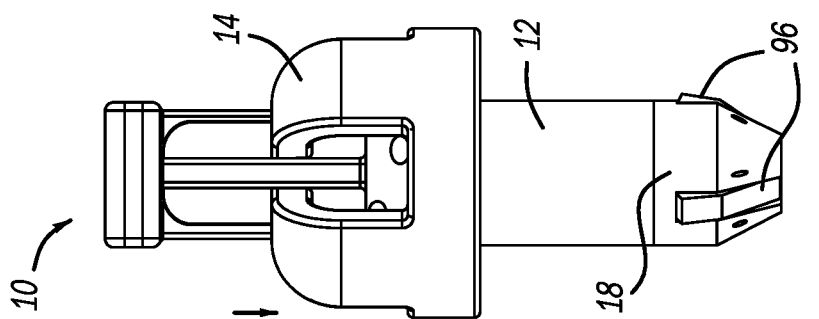

Next, with reference to FIGS. 6a, 7a, and 8, the operator lets go of the actuator 14, which causes the actuator 14 to be forced downward by gravity. In this way, the sleeve 16 rotates in the predetermined rotational direction due to the protrusions 68 traversing the curvilinear path 38. That is, the upper resting peaks 42b are offset from respective peaks 110 of the curvilinear path 38 (FIG. 8), which causes the protrusions 68 to be directed through the curvilinear path 38 in the predetermined direction when the actuator 14 is forced downwardly to contact the lower resting peaks 43b. When the protrusions 68 contact the lower resting peaks 43b, the activator 60 of the actuator 14 engages the upper portion 98 of the fingers 96, which causes the fingers 96 to rotate in the clockwise direction to the finger locked out position. When the fingers 96 are in the finger locked out position, the fingers 96 engage the object 11 such that the object can be moved from one location to another location, for example. Stated differently, when the fingers 96 are in the finger locked out position, the fingers 96 lock onto the object 11 such that the object 11 is inhibited from disengaging from the mechanical device 10.

Next, with reference to FIGS. 6b, 7b, and 8, when the object 11 has been moved to the new location, for example, the actuator 14 is forced upwardly by the operator. This causes the sleeve 16 to rotate in the predetermined rotational direction due to the protrusions 68 traversing the curvilinear path 38. That is, the lower resting peaks 43b are offset from respective upper peaks 112 of the curvilinear path 38 (FIG. 8), which causes the protrusions 68 to be directed through the curvilinear path 38 in the predetermined direction when the actuator 14 is forced upwardly to contact the upper resting peaks 42a. When the protrusions 68 contact the upper resting peaks 42a, the activator 60 is disengaged from the fingers 96 (i.e., the activator 60 does not force the fingers 96 in the finger locked out or finger locked in positions).

Finally, with reference to FIGS. 6c, 7c, and 8, the operator lets go of the actuator 14, which causes the actuator 14 to be forced downward by gravity. In this way, the sleeve 16 rotates in the predetermined rotational direction due to the protrusions 68 traversing the curvilinear path 38. That is, the upper resting peaks 42a are offset from respective lower peaks 114 of the curvilinear path 38 (FIG. 8), which causes the protrusions 68 to be directed through the curvilinear path 38 in the predetermined direction when the actuator 14 is forced downwardly to contact the lower resting peaks 43a. When the protrusions 68 contact the lower resting peaks 43a, the fingers 96 rotate in the counter-clockwise direction to the finger locked in position. When the fingers 96 are in the finger locked in position, the fingers 96 are disengaged from the object 11 such that the mechanical device 10 may be removed from the opening in object 11.

The mechanical device 10 of the present disclosure provides the benefit of allowing heavy objects to be moved from one place to another in areas where electrical power is limited or otherwise not available.

It should be understood that although the present disclosure discloses the pair of diametrically opposed protrusions 68 being a part of the sleeve 16 and the recessed track 34 being apart of the receiver 12, in some variations, the pair of diametrically opposed protrusions 68 may be apart of the receiver 12 and the recessed track 34 may be a part of the sleeve 16 without departure from the spirit and scope of the disclosure. The mechanical device 10 of the present disclosure may also be manufactured using an automated additive manufacturing machine (i.e., a 3-D printer). The mechanical device 10 of the present disclosure also does not include any biasing members (e.g., springs).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A mechanical device for grasping an object, the mechanical device comprising:
   a receiver comprising a distal end shaft having an internal bore, the internal bore defining a recessed track;
   an actuator slidably engaged with the receiver, the actuator comprising:
   a central shaft; and
   an activator disposed at a distal end portion of the central shaft;
   a rotatable sleeve disposed within the internal bore of the receiver and coupled to the actuator, the rotatable sleeve comprising at least one protrusion, the at least one protrusion disposed within the recessed track of the receiver;
   a pilot secured to a distal end portion of the receiver; and
   a grasping device mounted to the pilot and coupled to the activator.

2. The mechanical device according to claim 1, wherein the activator is a bulb having a diameter larger than a diameter of the central shaft.

3. The mechanical device according to claim 2, wherein the grasping device comprises a plurality of fingers rotatably mounted to the pilot, the plurality of fingers defining an upper portion having an internal profiled geometry conforming to an external surface of the bulb.

4. The mechanical device according to claim 1, wherein the rotatable sleeve comprises opposed protrusions.

5. The mechanical device according to claim 4, wherein opposed protrusions are diamond shaped.

6. The mechanical device according to claim 1, wherein the pilot is interchangeable.

7. The mechanical device according to claim 6, wherein the pilot is threadably engaged within the internal bore of the receiver.

8. The mechanical device according to claim 1, wherein the grasping device comprises a plurality of fingers rotatably mounted to the pilot.

9. The mechanical device according to claim 1, wherein the recessed track defines a curvilinear path having two sets of resting peaks, each set of resting peaks being at a different height relative to a centerline of the curvilinear path.

10. The mechanical device according to claim 1, wherein the actuator further comprises an upper flange and a lower flange, and the rotatable sleeve is mounted between the upper flange and the lower flange.

11. The mechanical device according to claim 1, wherein the pilot defines an inwardly tapered distal end portion.

12. The mechanical device according to claim 1, wherein the receiver further comprises a base portion adapted to be secured to an external component.

13. The mechanical device according to claim 12, wherein the receiver further comprises a plurality of support legs extending between the base portion and the distal end shaft, and the actuator comprises an outer ring defining a plurality of slots, wherein the plurality of support legs are disposed within the plurality of slots.

14. The mechanical device according to claim 1, wherein the mechanical device does not comprise any biasing members.

15. A mechanical device for grasping an object, the mechanical device comprising:
   a receiver comprising a distal end shaft having an internal bore, the internal bore defining a recessed track, the recessed track defining a curvilinear path having two sets of resting peaks, each set of resting peaks being at a different height relative to a centerline of the curvilinear path;
   an actuator slidably engaged with the receiver, the actuator comprising:

a central shaft; and
an activator disposed at a distal end portion of the central shaft;
a rotatable sleeve disposed within the internal bore of the receiver and coupled to the actuator, the rotatable sleeve comprising opposed protrusions, the opposed protrusions being disposed within the recessed track of the receiver;
a pilot secured to a distal end portion of the receiver; and
a grasping device mounted to the pilot and coupled to the activator.

16. The mechanical device according to claim 15, wherein opposed protrusions are diamond shaped.

17. The mechanical device according to claim 15, wherein the activator is a bulb having a diameter larger than a diameter of the central shaft.

18. The mechanical device according to claim 17, wherein the grasping device comprises a plurality of fingers rotatably mounted to the pilot, the plurality of fingers defining an upper portion having an internal profiled geometry conforming to an external surface of the bulb.

19. The mechanical device according to claim 15, wherein pilot is interchangeable.

20. A mechanical device for grasping an object, the mechanical device comprising:
a receiver comprising a distal end shaft having an internal bore, the internal bore defining a recessed track, the recessed track defining a curvilinear path having two sets of resting peaks, each set of resting peaks being at a different height relative to a centerline of the curvilinear path;
an actuator slidably engaged with the receiver, the actuator comprising:
a central shaft; and
a bulb disposed at a distal end portion of the central shaft;
a rotatable sleeve disposed within the internal bore of the receiver, the rotatable sleeve comprising opposed protrusions, the opposed protrusions defining a diamond shape and being disposed within the recessed track of the receiver;
an interchangeable pilot secured to a distal end portion of the receiver; and
a plurality of fingers rotatably mounted to the interchangeable pilot, the plurality of fingers defining an upper portion having an internal profiled geometry conforming to an external surface of the bulb.

* * * * *